United States Patent
Gammel et al.

(10) Patent No.: US 7,715,165 B2
(45) Date of Patent: May 11, 2010

(54) SYSTEM AND METHOD OF SURGE PROTECTION IN A POWERED DEVICE

(75) Inventors: John Gammel, Austin, TX (US); Richard B. Webb, Austin, TX (US); D. Matthew Landry, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 495 days.

(21) Appl. No.: 11/484,449

(22) Filed: Jul. 11, 2006

(65) Prior Publication Data

US 2008/0013243 A1    Jan. 17, 2008

(51) Int. Cl.
*H02H 3/20* (2006.01)
*H02H 9/04* (2006.01)

(52) U.S. Cl. ................. 361/111; 361/56; 361/91.1

(58) Field of Classification Search ........... 361/111, 361/56, 91.1
See application file for complete search history.

(56) References Cited

U.S. PATENT DOCUMENTS

| | | | | |
|---|---|---|---|---|
| 5,157,574 A | * | 10/1992 | Tuusa | 361/56 |
| 5,166,854 A | * | 11/1992 | Morishige | 361/91.6 |
| 5,572,395 A | * | 11/1996 | Rasums et al. | 361/58 |
| 5,615,094 A | | 3/1997 | Cosentino et al. | |
| 5,789,964 A | * | 8/1998 | Voldman | 327/380 |
| 6,404,275 B1 | * | 6/2002 | Voldman et al. | 327/538 |
| 6,630,805 B2 | | 10/2003 | Makaran | |
| 7,368,798 B2 | * | 5/2008 | Camagna et al. | 257/499 |
| 2003/0117676 A1 | * | 6/2003 | Nakamura et al. | 358/513 |
| 2003/0202311 A1 | * | 10/2003 | Duvvury | 361/111 |
| 2006/0145673 A1 | * | 7/2006 | Fogg et al. | 323/282 |
| 2007/0189495 A1 | * | 8/2007 | Crawley et al. | 379/323 |

FOREIGN PATENT DOCUMENTS

| WO | WO-2008005463 A2 | 1/2008 |
|---|---|---|
| WO | WO-2008005463 A3 | 2/2008 |

OTHER PUBLICATIONS

Lanoue, Bob, "Active EMI Power Filter and Hot Swap Functions Merge," CompactPCI and AdvancedTCA Systems, Aug. 2005.
International Preliminary Report on Patentability, PCT/US2007/015416, Jan. 5, 2009, 7 pgs.
Written Opinion, PCT/US2007/015416, Nov. 17, 2008, 6 pgs.

* cited by examiner

*Primary Examiner*—Stephen W Jackson
*Assistant Examiner*—Zeev Kitov
(74) *Attorney, Agent, or Firm*—Polansky & Associates, P.L.L.C.; Ronald Michael Reed (57) ABSTRACT

A powered device includes a first supply terminal, a second supply terminal, and at least one input pin coupled to the first supply terminal. The powered device further includes an external capacitor having a first terminal coupled to the first supply terminal, a switch coupled to the second supply terminal and coupled to a second terminal of the external capacitor, and power surge detection logic coupled to the switch. The external capacitor is charged in response to a detected power surge that exceeds a threshold.

13 Claims, 5 Drawing Sheets

SYSTEM AND METHOD OF SURGE PROTECTION IN A POWERED DEVICE

FIELD OF THE DISCLOSURE

The present disclosure is generally related to surge protection in Power over Ethernet (PoE) powered devices.

BACKGROUND

In general, power over Ethernet (PoE)-refers to a technique that is outlined in the IEEE Std 802.3™-2005 clause 33 (the PoE standard) for delivering power via Ethernet cabling to a powered device, which is an electronic device adapted to derive power from the Ethernet cabling. PoE eliminates the need for a separate power source for powered devices. Powered devices may include voice over Internet protocol (VoIP) telephones, wireless routers, security devices, field devices to monitor process control parameters, data processors, and the like.

In general, power sourcing equipment delivers power to one or more powered devices via a twisted pair network cable, such as an Ethernet cable. The PoE standard specifies that the power sourcing equipment should provide a power supply voltage having a range of 36 to 57 volts direct current (DC) and having a current that is limited to less than 400 mA. The use of extended cable lengths and transformers in some applications may induce transient voltage and current surges far in excess of 57 volts and 400 mA.

Conventionally, to manage such transients and other power events, many powered devices include a high voltage transient suppressor, which may protect circuitry of the powered device from high voltages by clamping the input voltage at or below a breakdown voltage threshold during a power surge event. A typical high voltage transient suppressor may be a high voltage zener diode, such as the SMAJ58A surface mount diode, which is commercially available from a wide variety of circuit component manufacturers. The high voltage zener diode is typically connected in parallel with a diode bridge between the positive and negative voltage supply terminals to clamp transient voltages in excess of a threshold to protect associated circuitry. For example, a typical zener diode is a 58-volt zener diode, which is designed to breakdown and conduct current at voltages in excess of 58 volts.

The PoE standard specifies that powered devices are required to survive transient events up to a 1000 volt power surge and to a transient current of 5 A. A transient surge with a duration of 300 nanoseconds to 50 microseconds dissipates considerably more energy than typical zener diodes are rated to withstand. If the high voltage transient suppressor is a diode stack including a plurality of zener diodes arranged in series, the duration of the transient power surge may cause the zener diodes to undergo self-heating. Additionally, typical zener diodes exhibit significant voltage overshoot during high-current events. This overshoot may damage other circuit elements of the powered device.

Therefore, there is a need for improved transient protection in powered devices.

SUMMARY

In one particular illustrative embodiment, a powered device includes a first supply terminal, a second supply terminal, and at least one input pin coupled to the first supply terminal. The powered device further includes an external capacitor having a first terminal coupled to the first supply terminal, a switch coupled to the second supply terminal and coupled to a second terminal of the external capacitor, and power surge detection logic coupled to the switch. The external capacitor is charged in response to a detected power surge that exceeds a threshold.

In another particular illustrative embodiment, a method is provided that includes detecting a power surge event at a first power supply terminal of an integrated circuit. The method further includes activating a surge protection circuit to shunt the power supply terminal to a second power supply terminal of the integrated circuit while concurrently activating a switch within the integrated circuit in response to detecting the power surge event to enable an external capacitor to receive energy associated with the power surge event.

In still another particular illustrative embodiment, a powered device includes at least one input responsive to an external power supply and a diode bridge responsive to the at least one input to provide a rectified power supply to a pair of supply terminals, including a first supply terminal and a second supply terminal. The powered device further includes a detector responsive to the first supply terminal and the second supply terminal to detect a surge event in excess of a threshold. The powered device includes an external capacitor including a first terminal coupled to the first supply terminal and including a second terminal, and a switch to selectively couple the second terminal of the external capacitor to the second supply terminal. Additionally, the powered device includes logic to selectively activate the switch in response to detection of the surge event to deliver energy resulting from the surge event to the external capacitor.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
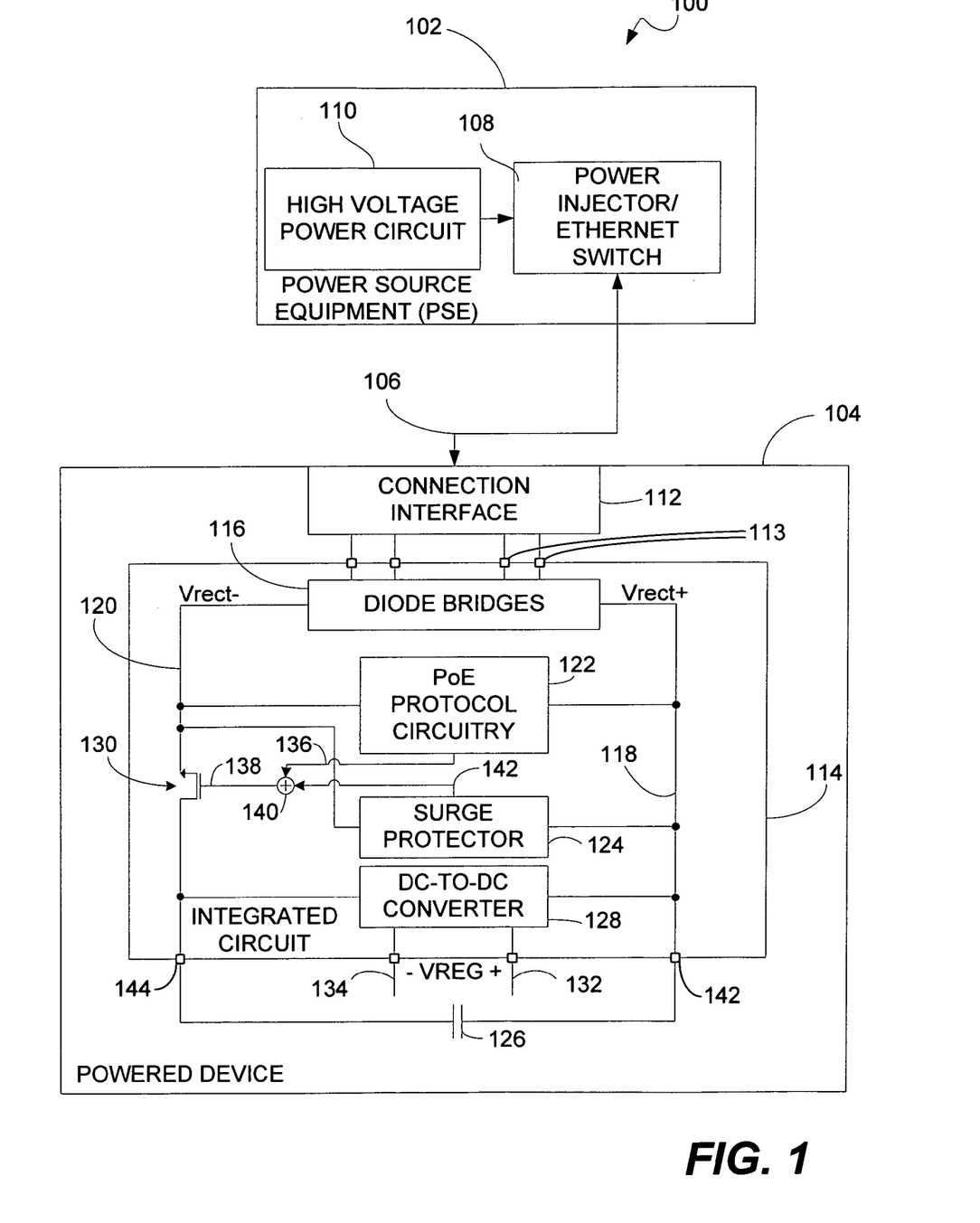
FIG. 1 is a general diagram of an embodiment of a Power over Ethernet enabled system with enhanced surge protection.

Referring to FIG. 1, a power over Ethernet system 100 is shown. The power over Ethernet system 100 includes power sourcing equipment (PSE) 102 and a powered device 104 coupled via a network connection 106, such as a twisted pair Ethernet cable, to the PSE 102. The PSE 102 includes a power injector/Ethernet switch 108 and a high voltage power circuit 110. The PSE 102 provides power and data communications over the network connection 106 to the powered device 104.

The powered device 104 includes a connection interface 112 coupled to the network connection 106 and includes an integrated circuit 114, and an input filter, such as the external capacitor 126. The integrated circuit 114 includes diode bridges 116, Power over Ethernet (PoE) protocol circuitry 122, a surge protector 124, and a DC-to-DC converter 128. In general, the integrated circuit 114 is formed from various functional elements and appropriate circuitry. The diode bridges 116 are coupled to the connection interface 112 via pins 113 to receive a power supply from the PSE 102 via the network connection 106. At least one input pin 113 is responsive to an external power supply, such as power provided via the network connection 106 from the PSE 102. The diode bridge 116 has an input that receives the power supply input from at least one input pin 113 of the connection interface 112. The diode bridge 116 is configured to couple the power supply input from the at least one input pin 113 to a first voltage supply terminal 118 and to a second voltage supply terminal 120 to provide a rectified power supply to the first and second supply terminals 118 and 120, which carry voltages identified as $V_{RECT}+$ and $V_{RECT}-$.

In general, the positive voltage supply terminal 118 is coupled to the external capacitor 126 via a pin 142, and the negative voltage supply terminal 120 is coupled to the capacitor 126 via a switch 130 (such as a field effect transistor) and via a pin 144. The PoE protocol circuitry 122, the surge protector 124, and the DC-to-DC converter 128 are coupled between the positive and negative voltage supply terminals 118 and 120. The PoE protocol circuitry 122 includes a control output 136, which is coupled to a control terminal 138 of the switch 130 via logic, such as an analog OR gate 140. The surge protector 124 includes a control output 142 that is coupled to the control terminal 138 of the switch 130 via the analog OR gate 140. One or both of the control outputs 136 and 142 may activate the switch 130 to connect the external capacitor 126 between the voltage supply terminals 118 and 120. The switch 130 selectively couples the second supply terminal 120 to a terminal of the external capacitor 126 via the pin 144.

The power over Ethernet (PoE) protocol circuitry 122 is responsive to the voltage supply terminals 118 and 120. The PoE protocol circuitry 122 is used to perform and to control PoE protocol detection and PoE protocol operations with respect to the powered device 104. For example, the PoE protocol circuitry 122 may provide appropriate current or voltage signals to respond appropriately to the PSE 102 during power detection and classification operations. Additionally, the PoE protocol circuitry 122 may activate the switch 130 when the powered device 104 is connected to the network cable 106 and may deactivate the switch 130 when the network cable 106 is disconnected, for example.

The surge protection logic 124 is configured to provide a current flow path between the first supply terminal 118 and the second supply terminal 120 in response to detecting that a power surge exceeds a given voltage threshold. Thus, the surge protector 124 protects other elements within the integrated circuit 114 from power surges. An example of a power surge is a voltage spike received from the network cable 106 or a power surge that results from an electrostatic discharge (ESD) event at a pin, such as the pins 113 of the integrated circuit 114. In general, a power surge or power surge event may include an over-voltage condition caused by ESD, by electrical fast transients (EFT), by lightning, by cable discharge events, or by another source. In general, a power surge event may include an electrostatic discharge (ESD) event, a lightning-induced transient voltage surge, and a floating cable discharge, or other similarly occurring or characteristic event.

In operation, the PoE protocol circuitry 122 provides a control output 136 to the control terminal 138 of the switch 130 via the analog OR gate 140 to complete a circuit across the DC-to-DC converter 128 and across the external capacitor 126. When the switch 130 is deactivated, the negative voltage supply on the voltage supply terminal 120 is not provided to the pin 144.

When a power surge is detected that exceeds the threshold of the surge protector 124, the surge protector 124 provides a current path to shunt power between the voltage supply terminals 118 and 120. Additionally, regardless of whether the switch 130 is active, the surge protector 124 can generate a control output 142 to the analog OR gate 140 to activate the switch 130 in response to detection of the power surge. If the switch 130 is already active, the control output 142 ensures that switch 130 remains active and that the voltage supply terminal 120 remains coupled to the pin 144. Thus, the surge protector 124, upon detection of a power surge that exceeds the threshold, can selectively activate the switch 130 to couple the second terminal of the external capacitor 126 to the second voltage supply terminal 120 via the pin 144, allowing current to flow into the external capacitor 126. The external capacitor 126 stores the extra energy resulting from the power surge instead of permitting the extra energy from being dispersed or discharged within elements of the integrated circuit 114.

In a particular embodiment, the PoE protocol circuitry 122 includes logic to activate and selectively deactivate the switch 130 during operation in response to connection and disconnection respectively of a network cable 106 to at least one input pin, such as input pin 113 via the connection interface 112. In a particular embodiment, the switch 130 includes a field effect transistor and may be part of a hot swap switch.

Also, as shown in FIG. 1, the external capacitor 126 may be configured as an input filter in parallel with the DC-to-DC converter 128. The external capacitor 126 provides a dual function of providing an input filter to the DC-to-DC converter 128 while also being available for storage of extra energy due to a power surge event detected by the surge protector 124.

Figure 2:
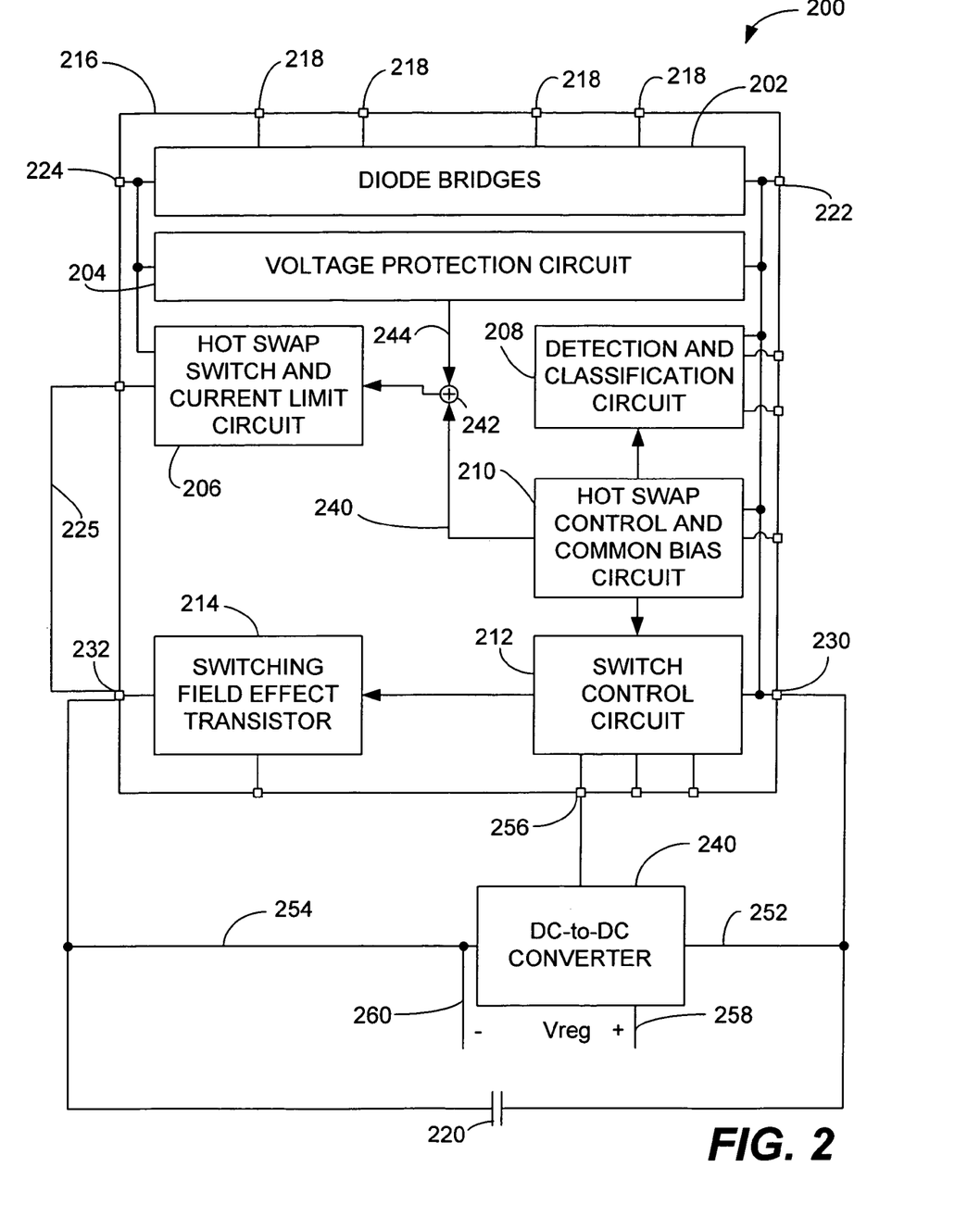
FIG. 2 is a partial block and partial circuit diagram illustrating a particular embodiment of a powered device integrated circuit with enhanced surge protection.

Referring to FIG. 2, another illustrative embodiment of a powered device 200 is shown. The powered device 200 includes an integrated circuit 216 having a plurality of inputs 218 and having a first power supply output 230 and a second power supply output 232. The first power supply output 230 and the second power supply output 232 may be coupled to an external capacitor 220. The integrated circuit 216 also includes one or more diode bridges 202, a voltage protection circuit 204, a hot swap switch and current limit circuit 206, a detection and classification circuit 208, a hot swap control and common bias circuit 210, a switch control circuit 212, and a switching field effect transistor 214. The switch control circuit 212, the hot swap control and common bias circuit 210, and the detection and classification circuit 208 are each coupled to a first power supply output 222 provided by the diode bridges 202. The hot swap switching current limit circuit 206 is coupled to a second power supply output 224 of the diode bridges 202.

In general, the diode bridges 202 are responsive to input pins 218 to receive a power supply from an external power source, such as the power sourcing equipment 102 in FIG. 1. The diode bridges 202 produce a rectified voltage on first and second power supply outputs 222 and 224. The voltage protection circuit 204 is coupled to the first and the second power supply outputs 222 and 224. The hot swap switch and current limit circuit 206 is coupled to the power supply output 224 and provides a switched output to power supply output 225, which is coupled to pin 232. The switching field effect transistor 214 is coupled to the power supply output 225.

The hot swap control and common bias circuit 210 is adapted to generate an output 240 to the hot swap switch and current limit circuit 206 via an analog OR gate 242 to selectively couple the second power supply output 224 to the power supply output 225 and to pin 232 during operation. The voltage protection circuit 204 provides a control output 244 to the hot swap switch and current limit circuit 206 via the analog OR gate 242 to selectively couple the second power supply output 224 to the power supply output 225. The voltage protection circuit 204 may selectively couple the second power supply output 224 to the power supply output 225 and to the pin 232 in response to detection of a power surge event.

The powered device 200 includes a DC-to-DC converter 240 that is external to the integrated circuit 216. The DC-to-DC converter 240 includes a first terminal 252 coupled to the first power supply output 230, a second terminal coupled to a pin 256, and a third terminal 254 coupled to the second power supply output 232. In general, the DC-to-DC converter 240 may be implemented as a transformer having a primary winding coupled between the first output 230 and the pin 256 and a secondary winding that is inductively coupled to the primary winding. The secondary winding may have a first terminal 258 and a second terminal 260 to provide a regulated supply voltage (Vreg) to associated load circuitry (not shown). The second terminal 260 may be coupled by line 254 to the second power supply output 232. In this embodiment, the external capacitor 220 serves both as a filter capacitor to the DC-to-DC converter 240 and as a supplemental surge protector to store energy from a surge event.

During operation, the hot swap switch and current limit circuit 206 is selectively activated in response to a control signal from the voltage protection circuit 204 to couple a terminal of the external capacitor 220 to the second voltage supply terminal 224 via the pin 232. The voltage protection circuit 204 detects an over-voltage condition, for example, due to a particular type of power surge event. The voltage protection circuit 204 may shunt excess energy between the power supply outputs 222 and 224 and may provide a control signal to the hot swap switch and current limit circuit 206. Once the hot swap switch and current limit circuit 206 is activated, the output 232 is coupled to the power supply output 224 providing a current path such that the external capacitor 220 can receive charge from excess energy due to the voltage protection condition and the associated power surge event.

Figure 3:
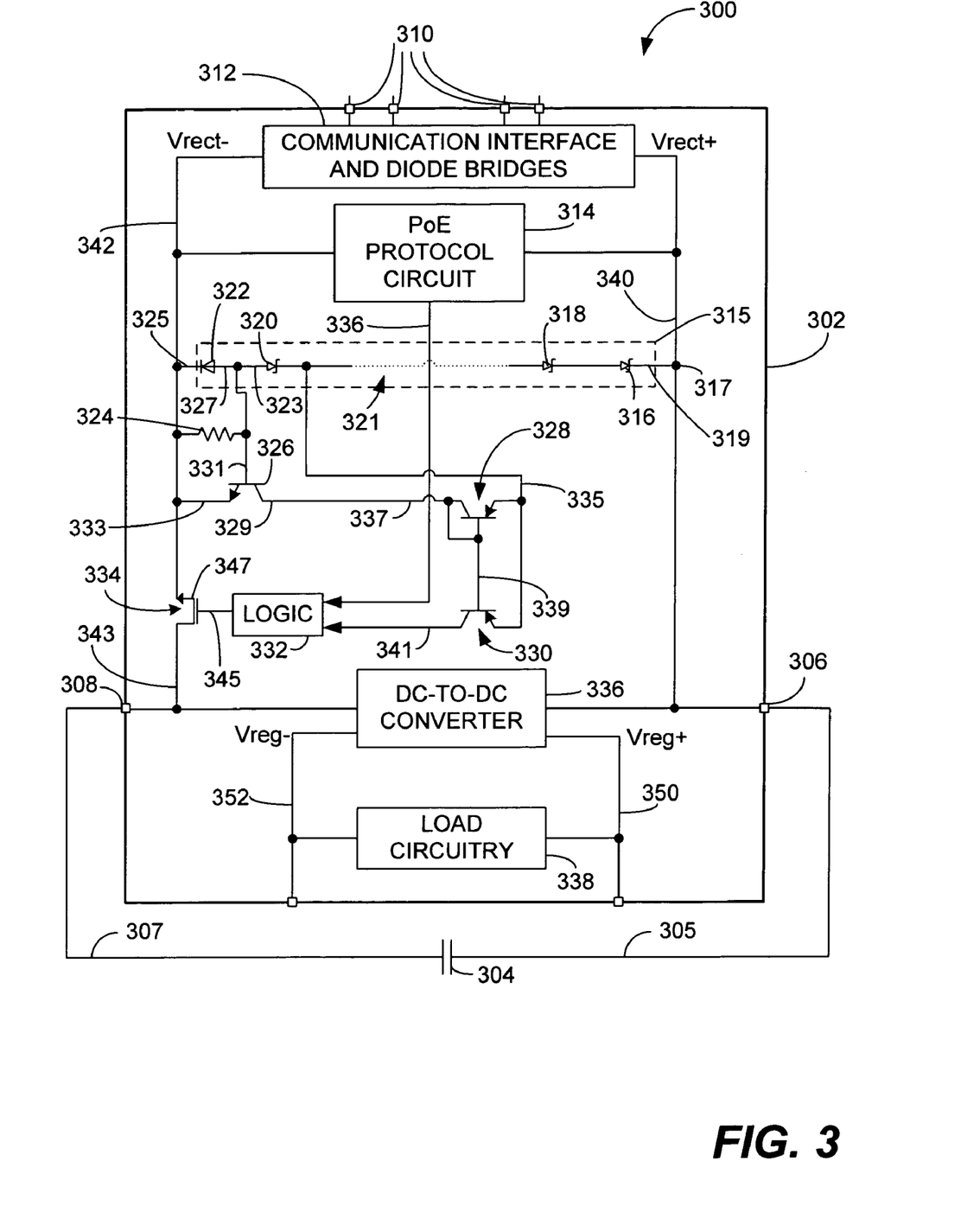
FIG. 3 is a partial block and partial circuit diagram illustrating a particular embodiment of a powered device integrated circuit, such as that shown in FIG. 1, with enhanced surge protection.

Referring to FIG. 3, another illustrative embodiment of a powered device 300 is shown. The powered device 300 includes an integrated circuit 302 that is coupled to an external capacitor 304 via power supply pins 306 and 308. The integrated circuit 302 includes input pins 310, a communication interface and diode bridges 312, a PoE protocol circuit 314, a diode circuit 315, a diode 322, a resistor 324, transistors 326, 328, and 330, logic 332, a field effect transistor 334, a DC-to-DC converter 336, and load circuitry 338. The diode circuit 315 includes a plurality of diodes 316, 318, and 320, which may be zener diodes. In general, the diode circuit 315 operates as a detector to detect a surge event in excess of a threshold. The diodes 316, 318 and 320 are arranged in series such that the breakdown voltages for each diode aggregates to define a total breakdown voltage of the diode circuit 315. In one particular embodiment, the total breakdown voltage of the diode circuit 315 defines a threshold above which a surge event may be detected.

The communication interface and diode bridges 312 are coupled to the input pins 310 to receive a power supply and data from a network cable, such as an Ethernet cable. The communication interface and diode bridges 312 operate to rectify the received power supply and to provide a rectified power supply via voltage supply terminals 340 and 342. The communication interface and diode bridges 312 may also include one or more transformers with center taps (not shown) to which the diode bridges may be coupled. The PoE control circuit 314 is coupled between the voltage supply terminals 340 and 342.

The diode circuit 315 may be designed to include additional diodes as indicated by the dotted line 321. Generally, the diodes 316, 318 and 320 are arranged to form a diode stack such that the diode circuit 315 has a cathode terminal 319 coupled to the voltage supply terminal 340 at a node 317 and having an anode terminal 323. The diode 322 includes a cathode terminal 325 coupled to the voltage supply terminal 342 and an anode terminal 327 coupled to the anode terminal 323 of the diode circuit 315. The transistor 326 includes a first (collector) terminal 329, a control (base) terminal 331 that is coupled to the anode terminals 327 and 323 of the diodes 322 and 320, and a second (emitter) terminal 333 that is coupled to the voltage supply terminal 342. The transistor 328 includes a first (collector) terminal 337 that is coupled to the first terminal 329 of the transistor 326. The transistors 328 and 330 share a second (emitter) terminal 335 coupled to the diode circuit 315 and a control (base) terminal 339 that is coupled to the second terminal 337. The transistor 330 includes a first (collector) terminal 341 that is coupled to the logic 332. The transistors 328 and 330 operate as a current mirror to activate a switch, such as the field effect transistor 334, via the logic 332 when the power surge exceeds the threshold. The transistor 334 includes a first (source) terminal 347 coupled to the voltage supply terminal 342, a control (gate) terminal 345 coupled to the output of the logic 332, and a second (drain) terminal 343 coupled to the pin 308. The DC-to-DC converter 336 is coupled between the voltage supply terminal 340 and the pin 308. The DC-to-DC converter 336 is adapted to produce a regulated supply voltage to regulated voltage terminals 350 and 352 and to the load 338 that is coupled between the regulated voltage terminals 350 and 352.

In one particular embodiment, the field effect transistor 334 also serves as a hot swap switch to turn off a power supply to the DC-to-DC converter 336 and to its associated load circuitry 338.

In general, the integrated circuit 302 of the powered device 300 includes inputs 310 that are responsive to an external power supply, such as the PSE 102 in FIG. 1. The communication interface and diode bridges 312 are responsive to the inputs 310 to provide a rectified power supply to a pair of supply terminals, the first supply terminal 340 and the second supply terminal 342. The diode circuit 315, in conjunction with the logic 332, operates as a detector that is responsive to the first supply terminal 340 and to the second supply terminal 342 to detect a power surge event in excess of a threshold, which may be defined by a breakdown voltage of the diode circuit 315. The external capacitor 304 includes a first terminal 305 coupled to the first supply terminal 340 via pin 306 and includes a second terminal 307 that is coupled to the second supply terminal 342 via pin 308 and via drain terminal 343 of the field effect transistor 334. The field effect transistor 334 operates as a switch to selectively couple the second terminal 307 of the external capacitor 304 to the second supply terminal 342. The logic 332 selectively activates the field effect transistor 334 in response to detection of the surge event to deliver energy resulting from the surge event to the external capacitor 304.

In operation, a voltage surge received at the inputs 310 to the integrated circuit 302 is rectified by the communication interface and diode bridges 312. The resulting rectified power supply is applied to the voltage supply terminals 340 and 342. When a power surge voltage at the voltage supply terminals 340 and 342 exceeds the aggregate breakdown voltage of the diode circuit 315, including the illustrated diodes 316, 318 and 320, current flows across the diodes 316, 318 and 320 to the control terminal of the transistor 326. The current activates the transistor 326, which draws current from the transistor 328, producing a mirrored current in the first terminal 341 of the transistor 330, thereby activating the field effect transistor 334 via the logic 332.

The field effect transistor 334 may be utilized as a hot-swap switch controlled by the PoE protocol circuit 314 through the logic 332. During the surge event, the transistor 334 may be activated by either the PoE protocol circuit 314 or the diode circuit 315 to deliver surge energy to the external capacitor 304 that also serves as an input capacitor for the DC-to-DC converter 336.

Upon termination of the power surge event, the external capacitor 304 may discharge through the DC-to-DC converter 336 and through associated load circuitry 338 or other load circuitry coupled to the regulated voltage terminals 350 and 352. For example, once the power surge event terminates, the current flowing into the external capacitor 304 stops, and the switch 334 may be deactivated. In this instance, the external capacitor 304 may have a stored voltage, which may discharged and which the DC-to-DC converter 336 may regulate and provide to the regulated voltage terminals 350 and 352 and any load circuitry coupled to the regulated voltage terminals 350 and 352.

In one particular embodiment, negative feedback from the source terminal 347 is fed back to the diode circuit 315 to deliver additional voltage to the control terminal 331 of the transistor 326, which transfers the feedback to the gate terminal 345 of the field effect transistor 334 via the current mirror (transistors 328 and 330) and via the logic 332. In particular, the negative feedback from the source terminal 347 of the field effect transistor 334 is fed back through the resistor 324 to the breakdown diode 320 and via the transistors 326, 328 and 330 to the logic 332 to the control terminal 345 of the field effect transistor 334 via the logic 332, thereby causing the field effect transistor 334 to conduct sufficient current to keep the voltage supply terminals 340 and 342 clamped at a voltage level that is approximately equal to the breakdown voltage of the diode circuit 315. This clamping action serves to reduce the likelihood of voltage overshoot which may be seen in typical zener-based transient voltage suppressors. A significant portion of the power surge energy may be delivered to the external capacitor 304. The remaining portion of the power surge energy may be absorbed by the diode bridges of the communication interface 312 and by the diode circuit 315.

It should be understood that the field effect transistor 334 may be activated either by the PoE protocol circuit 314 or by the surge detector (e.g. diode circuit 315, transistors 326, 328 and 330, and logic 332). Thus, the field effect transistor 334 may serve a dual role as both a hot-swap switch and as a power surge switch to connect the voltage supply terminals 340 and 342 to the DC-to-DC converter 336 and to the external capacitor 304. The external capacitor 304 is arranged in parallel to the DC-to-DC converter 336, allowing the capacitor 304 to provide a dual function as both an input filter to the DC-to-DC converter 336 and as a power storage device to absorb energy resulting from a power surge event. By steering current through the field effect transistor 334 and into the capacitor 304, the capacitor 304 may thus be used to serve a dual purpose: to filter the input voltage to the DC-to-DC converter 336 and to absorb some of the excess energy resulting from a transient power event.

In general, the external capacitor 304 has a size that is relatively large to comply with the PoE standard and to operate in conjunction with the field effect transistor 334. In one particular embodiment, the external capacitor 304 has a capacitance of approximately 22 uF. In response to a current surge of 5 Amperes for approximately 50 microseconds, the external capacitor 304 can absorb current until a change in a capacitive voltage ($\Delta V_{C1}$) of approximately 11.4 volts is reached, according to the following equation:

$$\Delta V_{C1} = \frac{5 \text{ Amps}}{22 \ \mu F} * 50 \ \mu S = 11.4 \text{ volts} \quad \text{(Equation 1)}$$

The external capacitor 304 may absorb the 11.4 volts, which represents the power spike (a change in voltage) due to the power surge.

In another particular illustrative embodiment, the capacitor is 10 uF, and the voltage protection circuit (i.e. the diode stack) 315 is designed to clamp the input voltage on the voltage supply terminals 340 and 342 to approximately 65 volts. In this instance, the external capacitor 304 may absorb a current of up to 13 A given a 50 uS transient, where $$I = C\frac{dV}{dt}.$$

The external capacitor 304 may absorb current as follows:

$$I = 10 \ \mu F * \frac{65v}{50 \ \mu s} = 13A. \quad \text{(Equation 2)}$$

By activating the field effect transistor 334 to connect the voltage supply terminal 342 to the external capacitor 304 via the pin 308, energy resulting from the power surge is directed to and absorbed by the external capacitor 304. Thus, the powered device 300 may withstand a much higher transient current than the source limited 5 A current specified by the PoE standard. Moreover, since a typical transient power surge begins decaying immediately after reaching a peak current, the time to charge the external capacitor 304 may increase, since the current provided to the external capacitor 304 is decreasing while the external capacitor 304 is charging. Since the external capacitor 304 takes additional time to charge as the power surge induced current decreases, the external capacitor 304 allows the powered device 300 to withstand a relatively high transient current that might otherwise overheat and damage the diode circuit 315.

Additionally, the external capacitor 304 and the field effect transistor 334 make it possible to reduce the size of the voltage protection diode circuit 315, since the breakdown diodes 316, 318, and 320 no longer need to dissipate as much of the energy from the transient power surge event. If the voltage protection circuit 315 is utilized to generate a turn-on signal for the field effect transistor 334 (the hot swap switch), the voltage protection circuit 315 need only consume sufficient energy to hold the field effect transistor 334 in an on-state to consume the remaining energy of the transient. Since the integrated circuit 302 includes the PoE protocol circuitry 314, which controls the field effect transistor 334, the same control signal that enables the field effect transistor 334 may disable the field effect transistor 334 to prevent unnecessary operation during an ESD-type or other type of fault condition.

Figure 4:
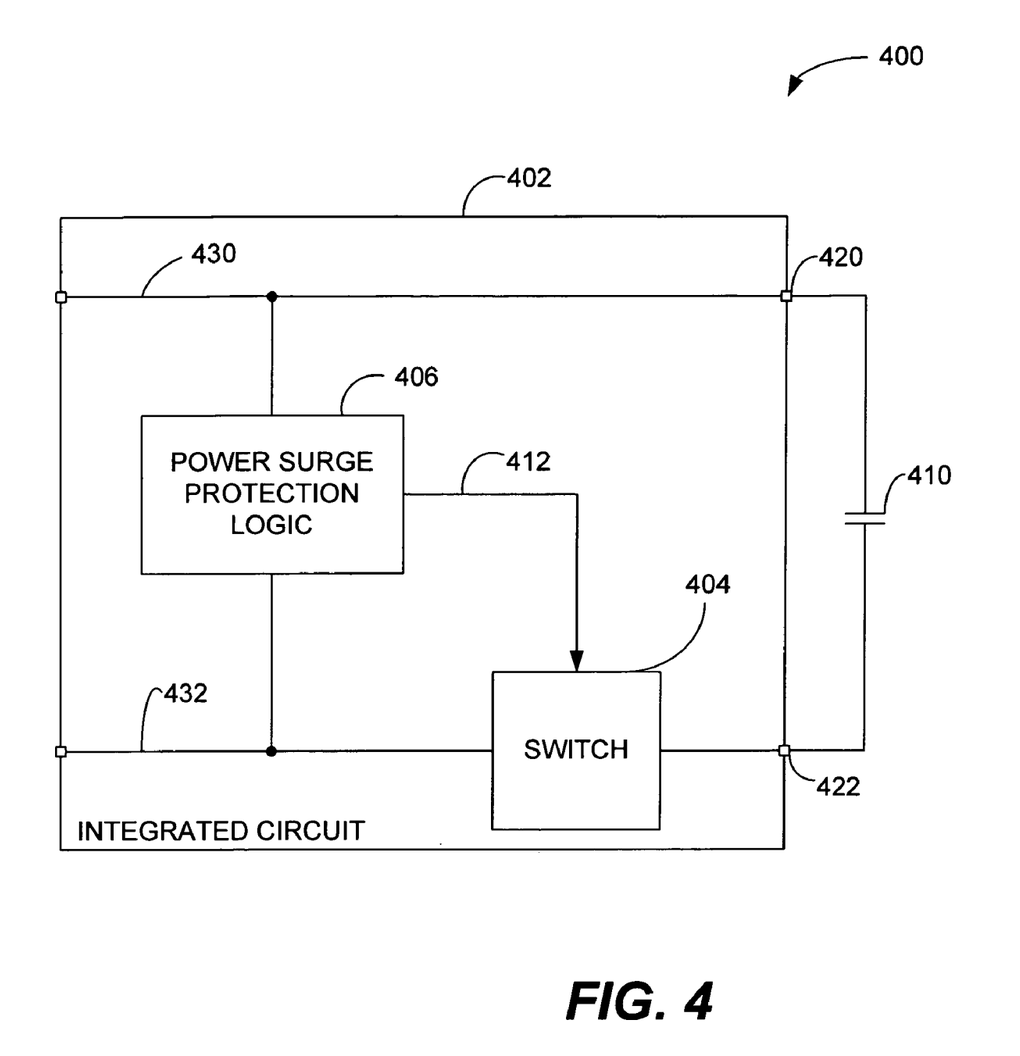
FIG. 4 is a block diagram illustrating a particular embodiment of a system, such as the systems shown in FIG. 1 or 2, to provide enhanced surge protection.

Referring to FIG. 4, a block diagram of another illustrative embodiment of a particular powered device 400 is shown. The powered device 400 includes an integrated circuit 402 including a first output 420 and a second output 422 that are coupled respectively to terminals of an external capacitor 410. The integrated circuit 402 includes power surge protection logic 406 and a switch 404. The switch 404 is controlled by a control signal 412 provided by the output of the power surge protection logic 406. The power surge protection logic 406 is coupled to a first power supply terminal 430 and to a second power supply terminal 432.

During operation, a power surge event is detected at the first power supply 430 by the power surge protection logic 406 within the integrated circuit 402. The power surge protection logic 406 then provides a shunting effect with respect to the first power supply terminal to the second power supply terminal 432 and provides an activation signal over control terminal 412 to the switch 404. In addition, the switch 404 is activated in response to detection of the power surge event to connect the second power supply terminal 432 to the pin 422, which enables the external capacitor 410 to receive energy associated with the power surge event. Thus, energy that exceeds a voltage threshold level that is detected by the power surge protection logic 406 may be provided safely to and shared by the external capacitor 410 and may avoid negative thermal and other power surge dissipation effects, such as a snap back voltage within the integrated circuit 402. The external capacitor 410 thereby provides an energy relief mechanism to assist with energy dispersion and storage of energy related to the power surge event.

In a particular embodiment, the switch 404 may be activated in a gradual manner and may react to feedback provided by the level of surge of the power surge event to provide a gradual turn on. With the gradual turn on, the switch 404 provides a gradually lower resistance level until the switch 404 is fully enabled. In this manner, the power surge protection logic 406 may provide a gradual and controlled turn on command to the switch 404 that thereby provides increased and controlled routing of excess energy to the external capacitor 410 as needed. In one particular embodiment, the switch 404 may include a voltage controlled field effect transistor that includes a gate terminal that is coupled to the power surge protection logic 406. The power surge protection logic 406 may control the voltage applied to the gate terminal of the transistor to throttle current flow through the capacitor 410.

In general, the term-power surge or power surge event includes, but is not limited to, an over-voltage condition caused by ESD, by electrical fast transients (EFT), by lightning, by cable discharge events, or by another source. An over-voltage condition includes, but is not limited to, a voltage level that exceeds a threshold. In general, a power surge event may be caused by an inductive kick back from a DC-to-DC converter, for example, when a cable carrying DC current is disconnected from the powered device. If a powered device, for example, is drawing 300 mA of current and the Ethernet cable is disconnected, an inductive kick may be created. The length of the Ethernet cable determines the inductance, so a long Ethernet cable may produce a larger inductive kick. In one embodiment, the inductive voltage kick may create an electrical arc, which can damage the RJ-45 Ethernet connection interface and create large differential voltage signals.

Additionally, when an Ethernet cable is unplugged, one pin may physically disconnect from the powered device before the other pins. This asynchronous disconnection may be a result of construction variation within a connector. If one pin disconnects, an imbalance may be created in the current that should be flowing in a common mode via transformer windings of a connection interface. This imbalance may appear as a large differential signal.

Moreover, cable discharge events may cause a power surge. Cable discharge events may be caused by charge storage on a cable from being dragged on the floor or for contacting high-voltage sources. Ethernet cables, such as CAT-5e and CAT-6, are designed to have very low leakage, so such cables may hold a charge for a period of time. When the cable is plugged in, the stored charge may discharge into the powered device. If, due to construction variations, one pin establishes a connection first, a large transient may be created.

By utilizing an external capacitor and a switch to couple the external capacitor to the power supply terminals, power surge events (regardless of their source) may be contained, controlled, and dissipated by shunting voltage between the power supply terminals and by storing excess energy in the external capacitor, as described above with respect to FIG. 14.

Figure 5:
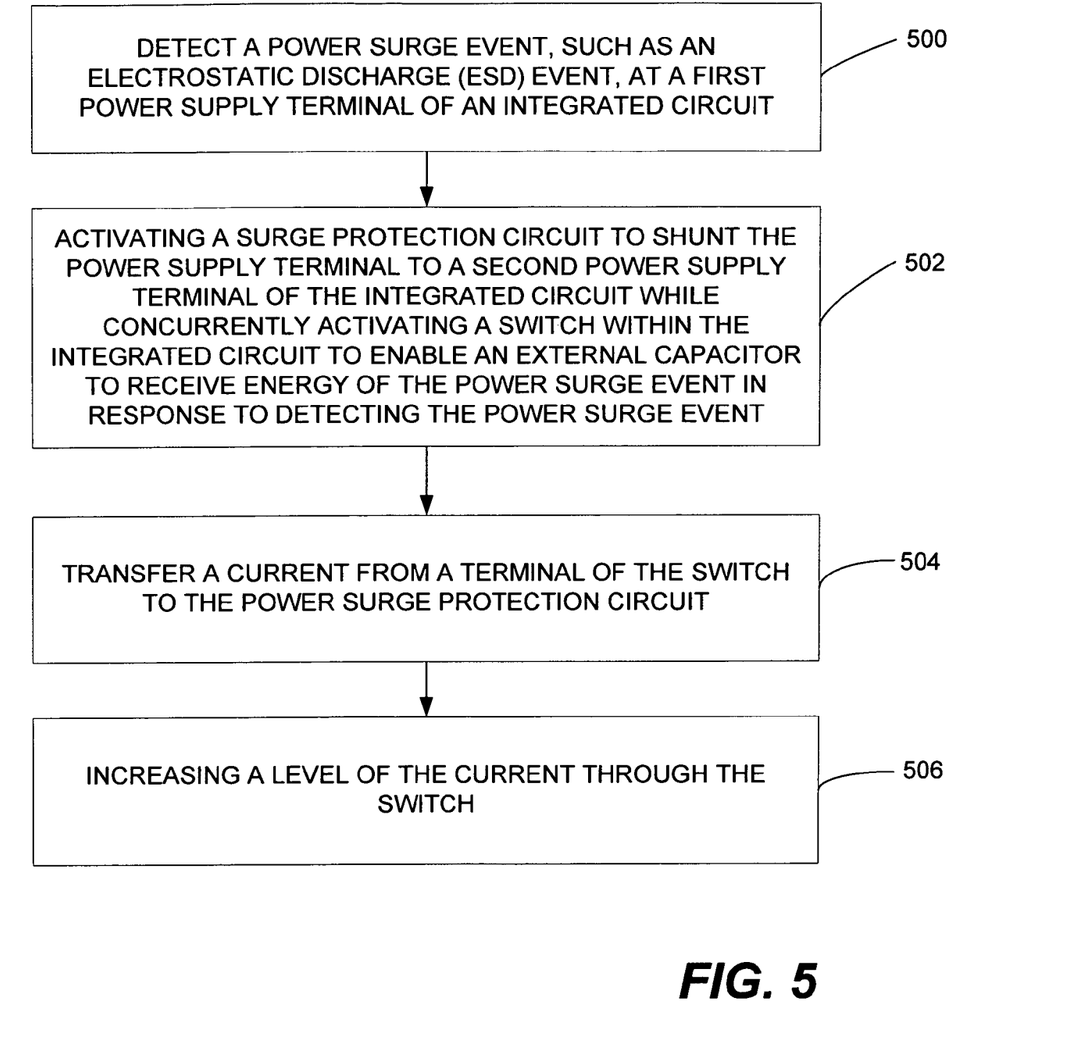
FIG. 5 is a flow diagram of a particular embodiment of a method of providing enhanced surge protection.

Referring to FIG. 5, a method of operating a powered device such as those shown with reference to FIGS. 1-4 is shown. The method includes detecting a power surge event, such as an electrostatic discharge (ESD) event at a first power supply terminal of an integrated circuit, at 500. The method further includes activating a surge protection circuit to shunt the power supply terminal to a second power supply terminal of an integrated circuit while concurrently activating a switch within the integrated circuit to enable an external capacitor to receive energy associated with the power surge event in response to detecting such power surge event, as shown at 502. The method also includes transferring current from a terminal of the switch to the power surge protection circuit, as shown at 504, and increasing a level of the current through the switch, as shown at 506. In addition, a portion of the energy from the surge protection circuit may be fed back to provide a further adjustment in controlled management of the switch and the resulting energy provided to charge the external capacitor.

Although the present specification describes components and functions that may be implemented in particular embodiments with reference to particular standards and protocols, the invention is not limited to such standards and protocols. For example, the IEEE STD 802.3™ standard for PoE represents an example of the state of the art. Such standards are periodically superseded by newer equivalents specifying substantially similar functions and specifying additional requirements. Accordingly, replacement standards and protocols having the same or similar functions as those disclosed herein are considered equivalents thereof.

In general, though the embodiments described above have focused largely on PoE implementations, it should be understood that the surge protection systems and methods, such as that described above with respect to FIGS. 1-5, may be utilized in other applications where it is desirable to protect load circuitry from power surge events. Moreover, the above-described embodiments may be employed with other types of powered networks, where the power supply voltage cabling also carries data. For example, the power supply and data may be received from a bus including power and data. Alternatively, the power supply may be derived from electrical power lines that also carry data transmissions. In general, a powered device may be adapted to derive power and to receive data from the same wire, wire pair, or alternative communication link, regardless of the network type.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A powered device comprising:
    a first supply terminal and a second supply terminal;
    at least one input pin coupled to the first supply terminal;
    an external capacitor having a first terminal coupled to the at least one pin of the first supply terminal and having a second terminal;
    a switch coupled to the second supply terminal and coupled to the second terminal of the external capacitor to selectively couple the external capacitor between the first and second supply terminals, wherein the switch comprises a field effect transistor including a source terminal coupled to the second terminal of the external capacitor, a gate terminal, and a drain terminal coupled to the second supply terminal; and
    power surge detection logic coupled to the gate terminal of the switch;
    wherein the external capacitor is charged in response to a detected power surge that exceeds a threshold voltage;
    wherein current is fed back from the drain terminal to the gate terminal via the power surge detection logic to change a gate voltage at the gate of the field effect transistor.

2. The powered device of claim 1, wherein the power surge detection logic is to activate a current flow path between the first supply terminal and the second supply terminal in response to detecting that the power surge exceeds the threshold voltage.

3. The powered device of claim 1, wherein the at least one input pin is responsive to an external power supply, the powered device further comprising:
    a diode bridge having an input to receive a power supply input from the at least one input pin, the diode bridge to couple the power supply input to the first supply terminal and to the second supply terminal to provide a rectified power supply to the first and second supply terminals.

4. The powered device of claim 1, further comprising:
    logic to selectively activate and deactivate the switch during operation in response to connection and disconnection, respectively, of a network cable to the at least one input pin.

5. The powered device of claim 1, wherein the first supply terminal, the second supply terminal, the at least one input pin, the switch, and the power surge detection logic are fabricated on an integrated circuit.

6. The powered device of claim 1, wherein the power surge results from an electrical event selected from a group consisting of an electrostatic discharge (ESD) event, a lightning-induced transient voltage surge, and a floating cable discharge.

7. The powered device of claim 1, wherein the power surge detection logic comprises:
    a diode circuit comprising a plurality of diodes arranged in series, wherein a sum of breakdown voltages of the plurality of diodes defines the threshold voltage;
    an n-type transistor including a collector terminal, a control terminal coupled to the diode circuit, and an emitter terminal coupled to the second supply terminal; and
    a current mirror having a first terminal coupled to the diode circuit and a second terminal coupled to the collector terminal of the n-type transistor and having a third terminal coupled to the gate terminal of the field effect transistor, the current mirror to mirror a current at the n-type transistor to activate the switch when the power surge exceeds the threshold.

8. The powered device of claim 1, wherein the switch comprises a hot swap switch.

9. The powered device of claim 1, wherein the external capacitor comprises an input capacitor of a DC-to-DC converter.

10. A method comprising:
    detecting a power surge event at a first power supply terminal of an integrated circuit; and
    activating a surge protection circuit to shunt current between the first power supply terminal and a second power supply terminal of the integrated circuit while concurrently activating a switch within the integrated circuit in response to detecting the power surge event to enable an external capacitor to receive current associated with the power surge event;
    wherein the switch comprises a voltage controlled field effect transistor and wherein a gate terminal of the voltage controlled field effect transistor is coupled to the surge protection circuit, wherein the method further comprises:
    transferring a current from a drain terminal of the voltage controlled field effect transistor to the surge protection circuit; and
    increasing a level of the current through the voltage controlled field effect transistor by providing at least a portion of the transferred current to the gate terminal.

11. The method of claim 10, further comprising:
    feeding back a portion of the current to the surge protection circuit.

12. The method of claim 10, wherein the power surge event comprises an electrical event selected from a group consisting of an electrostatic discharge (ESD) event, a lightning-induced transient voltage surge, and a floating cable discharge.

13. The method of claim 10, wherein the switch comprises a hot swap switch to selectively couple a DC-to-DC converter to a communication interface.

* * * * *